COLLAPSIBLE STRUCTURE

Original Filed Sept. 17, 1962 2 Sheets-Sheet 1

INVENTORS.
JAMES F. USHER
JOHN A. USHER
JOHN R. USHER
BY DRESSLER, GOLDSMITH, CLEMENT & GORDON
Attorneys.

COLLAPSIBLE STRUCTURE

Original Filed Sept. 17, 1962 2 Sheets-Sheet 2

INVENTORS.
JAMES F. USHER
JOHN A. USHER
JOHN R. USHER
BY DRESSLER, GOLDSMITH, CLEMENT & GORDON
Attorneys.

United States Patent Office

Re. 26,354
Reissued Feb. 20, 1968

26,354
COLLAPSIBLE STRUCTURE

John R. Usher, 7548 S. Chappel Ave., and James F. Usher, 7412 S. Shore Drive, both of Chicago, Ill. 60649, and John A. Usher, deceased, late of Chicago, Ill., by Marcella C. Usher, executrix, 7412 S. Shore Drive, Chicago, Ill. 60649

Original No. 3,190,406, dated June 22, 1965, Ser. No. 223,885, Sept. 17, 1962. Reissue No. 26,215, dated May 30, 1967, Ser. No. 544,655, Apr. 1, 1966. This application for reissue May 17, 1967, Ser. No. 646,748
17 Claims. (Cl. 52—646)

Matter printed in italics indicates the additions made by the first reissue; matter printed in boldface (except reference figures and claim numbers) indicates the additions made by this reissue.

ABSTRACT OF THE DISCLOSURE

A retractable and foldable cross brace is disclosed for a collapsible structure that includes a pair of end members that are shiftable towards and away from each other. The retractable and foldable cross brace has a pair of endwise extensible brace assemblies disposed diagonally in intermediately intersecting relation, each brace assembly including endwise telescopically engaged outer and inner mating slide members. A floating tie plate structure embraces and interconnects oppositely outwardly directed outer wall portions of the outer slide members and includes spacer structure offset from the region of intersection of the braces and separate pivots engaging each outer wall portion to permit each of the brace assemblies to be rotated about its pivot while allowing each inner slide member to slide endwise past the pivot.

Our invention relates generally to framing and specifically to a framework which may be collapsed into a compact unit for storage and shipment or transporting.

Accordingly, a primary object of our invention is to provide a framework suitable for supporting a scaffold, a similar framework, or the like, which is simple, compact, strong and very light.

A further object is to provide a collapsible framework which can be stacked to build a supporting structure of any desired height.

Another object is to provide a collapsible brace assembly having a novel angular expansion limit means which acts as a pivot for crossing, overlapping brace members, and positively limits their relative angularity with respect to one another.

Yet a further object is to provide a collapsible framework in which the top collapses inwardly faster than the bottom to thereby provide a base of maximum width and stability, at all times.

Yet another object is to provide a collapsible framework of adjustable width.

Other objects and advantages will be apparent from a reading of the following description of the invention.

The invention is illustrated more or less diagrammatically in the accompanying drawings in which.

Like reference numerals will be used to refer to like parts throughout the following description.

Figure 1:
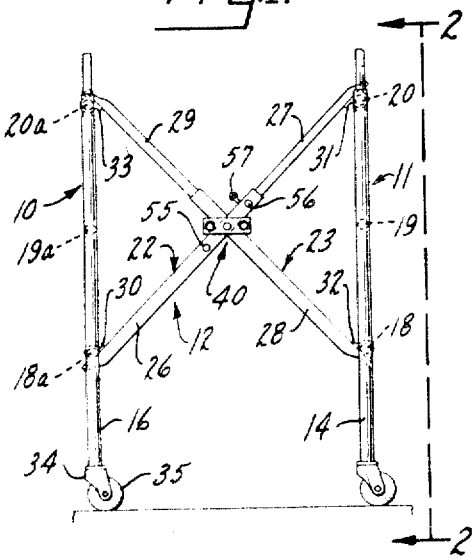
FIGURE 1 is a front elevation of our framework.
Figure 2:
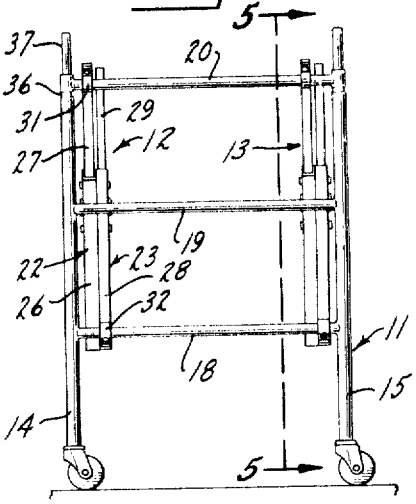
FIGURE 2 is a view taken substantially along the line 2—2 of FIGURE 1.

Referring first to FIGURES 1 and 2, our collapsible framework includes a pair of rigid sideframes 10, 11, and one or more, usually a pair, of folding cross braces indicated generally at 12, 13. The folding cross braces form, in effect, collapsible sideframes. Each of the rigid sideframes includes a pair of rigid corner members 14, 15 and 16, 17. (See FIGURES 3 and 4.) The corner members are maintained parallel to one another by a plurality of struts 18, 19, 20, and 18a, 19a, 20a. Although three struts on each side have been illustrated in this instance, a greater or lesser number may be employed depending upon the strength and rigidity to be built into the framework.

Figure 4:
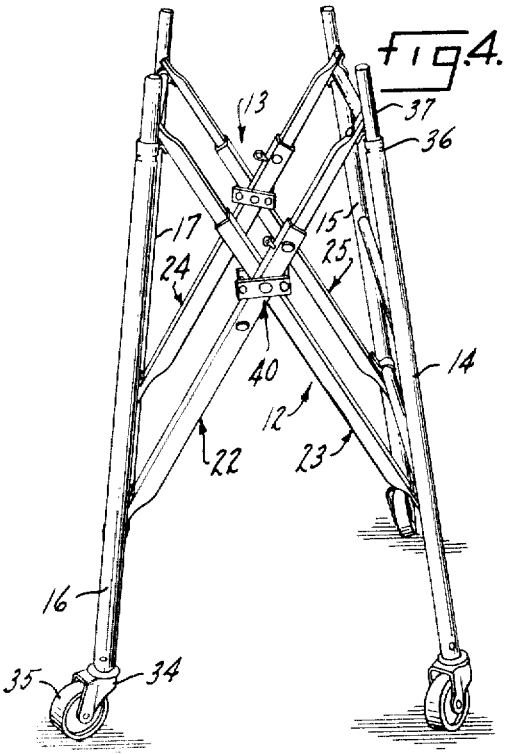
FIGURE 4 is a perspective view of our framework in a partially collapsed position.
Figure 7:
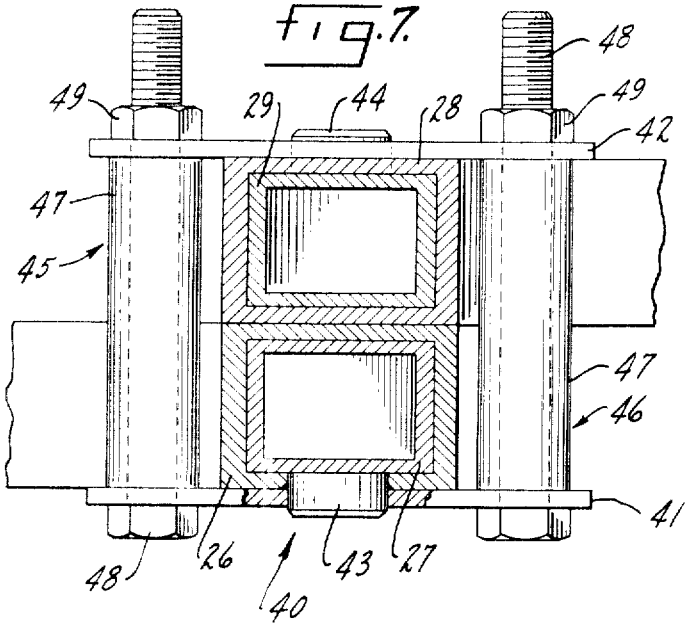
FIGURE 7 is a view taken substantially along the line 7—7 of FIGURE 6.

Each folding cross brace consists of a pair of crossed, overlapping diagonal brace assemblies 22, 23 and 24, 25, as best seen in FIGURE 4. Each diagonal brace assembly consists of, in this instance, a pair of sliding telescopic rectangular tubular members 26, 27 and 28, 29, as best seen in FIGURES 1 and 7. The lower end of outer tubular member 26 is pivotally connected to strut 18a by a flanged, half-moon shaped bracket 30 shown best in FIGURES 1 and 2. The upper end of internal tubular member 27 is connected to strut 20 by a similar connecting bracket 31. As best seen in FIGURE 2, the points of connection of diagonal brace assembly 22 to struts 18a and 20, and of diagonal brace assembly 23 to struts 18 and 20a, lie inwardly from the joint between the strut and corner member a distance sufficient to permit the corner members to practically abut one another when our framework is completely collapsed, as in FIGURE 5.

The lower end of outer tubular member 28 is pivotally connected to strut 18 by a similar bracket 32, and the upper end of inner member 29 is connected to strut 20a by bracket 33. The relative positions of the brackets along the struts and the clearance between the brace and corner members are best seen in FIGURE 2.

The connections of folding cross brace 13 to its associated strut members are substantially identical.

The ends of the cross braces may be pivoted to structure other than the struts, for example pivot stubs or brackets extending from the corner members.

The corner members 14, 15, 16 and 17 are tubular as shown in FIGURE 4. A caster consisting of a swivel bracket 34 and wheel 35 is received in the bottom of each corner member. The upper end of each corner member may be necked down as at 36 to provide a stop beyond which a short extension 37 will not travel. The short pipe extensions provide a base to receive the bottom ends of similar corner members 38, 39 of a substantially identical framework which thereby enables the frameworks to be stacked one on top of the other. Such an arrangement is illustrated in FIGURE 3.

Means for limiting the angle between the overlapping diagonal braces in each folding cross brace, and for maintaining said braces in abutted coupled and pivoted relationship, is indicated generally at 40. The limiting means is a limiting and pivoting device which consists essentially of a pair of tie plates or bars 41, 42 which are pivotally received on oppositely located stub pivot shafts 43, 44 welded to the outer faces of tubular sleeves 26, 28. A pair of spacers connecting the tie plates together are indicated at 45, 46. Each spacer consists essentially of a sleeve 47 which is held between the tie plates by a bolt 48 running therethrough and nut 49. While stub shafts 43, 44 are shown on the sleeves 26, 28, it will be understood that a plurality of oppositely positioned holes or depressions could be formed in the outer tubular members, and stub pivots could be formed on the tie plates for entry into such depressions.

Figure 6:
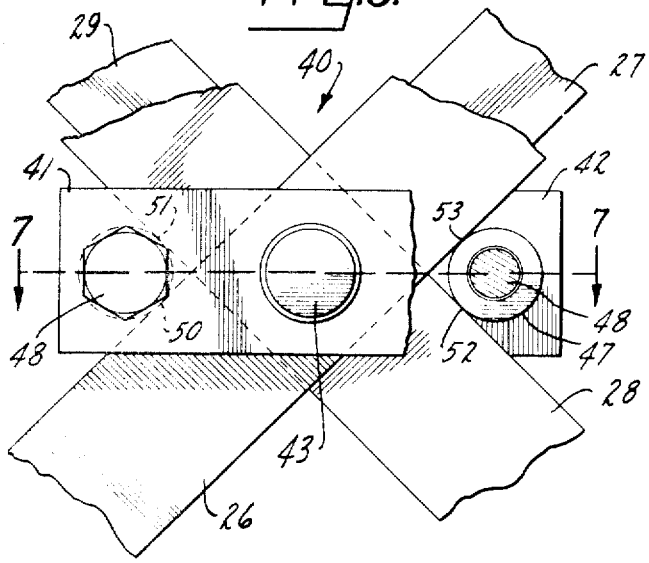
FIGURE 6 is a detail to a larger scale of an element of the invention.
Figure 8:
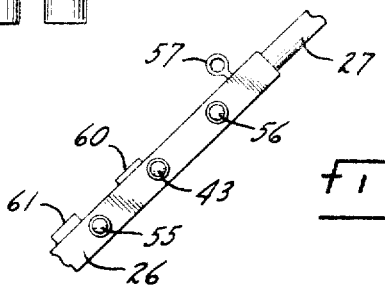
FIGURE 8 is a detail view of a modified brace assembly on a reduced scale.

Spacer members 47 are slightly longer than the distance between the outer faces of members 26 and 28 to insure free swinging movement about the stub pivots. As best seen in FIGURE 6, outer tubular members 26, 28 make substantially line contact with the spacers 47 at 50, 51 and 52, 53. By the addition of shims between the spacers and the outer tubular members, or by the use of spacers having diameters different from that shown, the angle between the brace assemblies may be varied as needed. To provide for use of one-diameter spacers in association with each of the pivot points 55, 43, 56, for example, shims of varying thickness can be affixed to sleeves 26, 28, the diameter of the spacers being set for use with pivot 56 and shims 60, 61 of increasing thickness being located for use with said spacers when pivots 43 and 55 are employed, as best seen in FIGURE 8.

Figure 3:
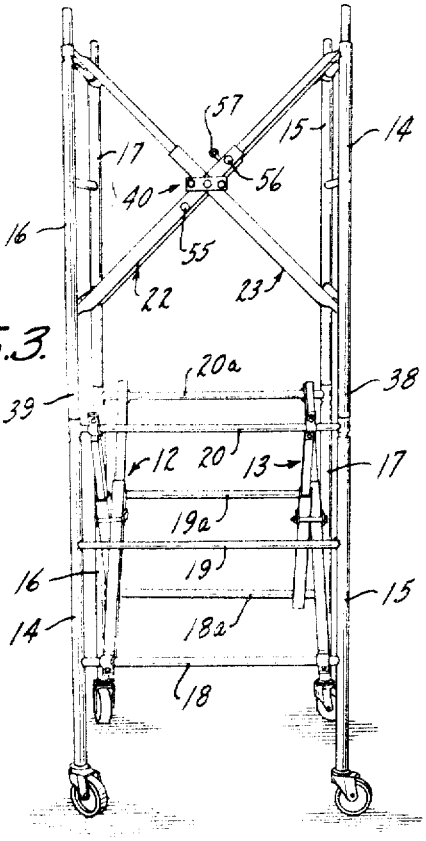
FIGURE 3 is a view of two of our frameworks stacked, one atop the other with corresponding parts in the two frameworks rotated 90 degrees from one to the other.

A plurality of additional pairs of oppositely positioned stub pivots are indicated generally at 55, 56 in FIGURE 3. Although only two additional pairs have been shown, it will be understood that a greater or lesser number may be employed as desired.

Means for locking the outer tubular members to the inner members are indicated at 57. In this instance a set screw threaded through tubular member 26 has been illustrated but it will be understood that within the scope of our invention a removable pin or other suitable locking or clamping device may be employed.

The use and operation of our invention are as follows:

The width between the substantially rigid sideframes 10, 11 is determined by the location and components of the limiting and pivoting device 40, and the adjustment of the diagonal brace member. The sideframes 10, 11 are collapsed to the point at which a pair of oppositely positioned stub pivot shafts or indenture pivots are in approximate alignment. In FIGURES 1 and 2 the center set of stub pivots 43, 44 has been selected. The tie plates 41, 42 are then slipped on the stub pivot shafts, the spacers 47 aligned with the apertures at the end of the tie plates, and bolts 48 passed through the tie plate apertures and spacers. The nut 49 is then secured tightly against the tie plates to prevent the tie plates from slipping off the stub pivots.

The length of each diagonal brace member is then set by loosening or withdrawing set screw or pin 57 and sliding interior tubular members 27, 29 out of the exterior tubular members 26, 28, until a desired operative position is reached. The locking screw or pin is then repositioned. The framework is opened by pulling outwardly on the rigid sideframes to the position of FIGURES 1 and 2. In this position the upper struts 20, 20a provide a two-point support for a platform or similar structure.

The framework is of course movable on wheels 35.

By proper adjustment of the length of the diagonal brace members, the distance between the substantially rigid sideframes 10, 11 can be adjusted to be identical with the width of one of the rigid sideframes. In this event a second framework can be placed on top of a lower one as illustrated in FIGURE 3. Preferably, the frameworks are so positioned that corresponding parts from framework to framework are rotated 90 degrees with respect to one another. The struts of the lower framework provide increased rigidity in the framework in the direction parallel to the longitudinal axis of the struts, and the struts in the upper framework provide increased rigidity in the framework in a direction perpendicular to the lower struts. The combination of the two frameworks thereby provides a strong compact framework which will enjoy maximum rigidity when subjected to the imposition of forces from any direction.

The width of our framework is governed by suitable adjustment of the length of the diagonal brace members, the location of the tie plates, and the angle between the crossed brace assemblies.

One important advantage of our invention is the fact that when the framework is being collapsed the upper part can be made to collapse further inwardly than the lower portion to thereby provide a base of maximum width and stability. Our framework is thereby self-sustaining and more stable until it is completely collapsed. This is accomplished by adjusting the telescopic members with respect to one another to a position in which the distance between the point of connection of the diagonal brace members to the upper struts and the stub pivot 43 is less than the distance between the point of connection of the diagonal brace members to the lower struts and the stub pivot 43. For any given increment of collapsing thrust against the rigid sideframes, the upper struts 20, 20a will move inwardly a further distance than lower struts 18, 18a. Our framework in a partially collapsed condition is illustrated in FIGURE 4. This is of advantage in that the framework in a partially collapsed condition can be wheeled from place to place thereby avoiding lifting by hand or machine. Moreover, the lock pin 57 can be provided with suitably placed apertures in members 26, 27 to lock the framework of the invention in a partially collapsed configuration similar to that in FIGURE 4, in which configuration the framework may be useful for a variety of function, such as that of a sawhorse for example.

Figure 5:
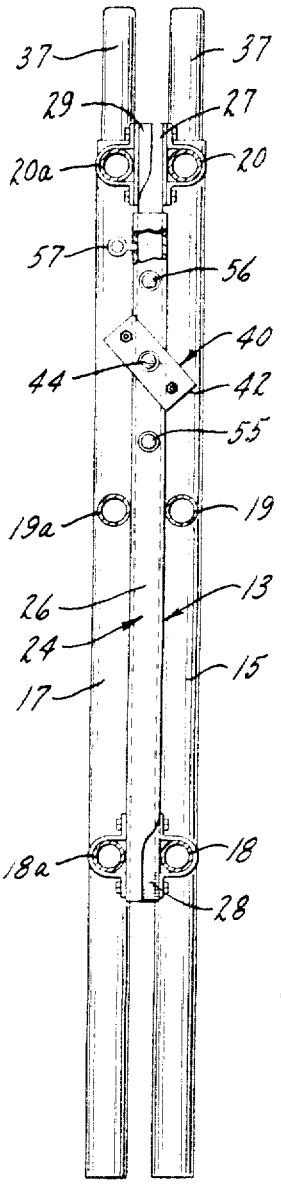
FIGURE 5 is a section taken substantially along the line 5—5 of FIGURE 2 showing our framework in a completely collapsed condition.

By locating the diagonal brace members inwardly along the struts a distance sufficient to clear the corner members 14, 15, 16, 17, our framework may be collapsed to the compact position illustrated in FIGURE 5. Similarly, the cross braces may be pivoted on stud shafts extending outwardly from the corner members. Referring to FIGURE 2, for example, it will be noted that a clearance is provided between the ends of the stub pivot shafts and corner members 14, 16. This permits the rigid sideframes to be collapsed to a position in which the distance therebetween is equal to the width of the exterior members 26, 28 since these members strike against mid struts 19, 19a, as best seen in FIGURE 5.

In view of the obvious variations which are possible from the foregoing exemplary description, it is our intention that the scope of our invention be measured not solely by the description, but rather by the following claims as interpreted in light of the prior art, having due regard to the doctrine of equivalents.

We claim:

1. A foldable cross brace including a pair of crossed diagonal brace assemblies, a pair of tie members spaced outwardly of said brace assemblies on opposite sides thereof and extending across the intersection of said assemblies in alignment with each other, pivot means formed on said tie members and outer facing portions of the brace assemblies to permit the brace assemblies to be rotated relative to each other about said pivot, and a pair of spacers extending between said tie members and located on opposite sides of said pivot between said brace assemblies with said spacers and the pivot lying in the same plane, said spacers being engageable with said brace assemblies to limit rotation of the brace assemblies toward each other, said spacers being removable so that spacers of varying thickness can be substituted to vary the minimum angle between the brace assemblies.

2. A foldable cross brace including a pair of crossed diagonal brace assemblies, a pair of tie members spaced outwardly of said brace assemblies on opposite sides thereof and extending across the intersection of said assemblies in alignment with each other, pivot means formed on said tie members and outer facing portions of the brace assemblies to permit the brace assemblies to be rotated relative to each other about said pivot, and a pair of spacers extending between said tie members and located on opposite sides of said pivot between said brace assemblies with said spacers and the pivot lying in the same plane, said spacers being engageable with said brace assemblies to limit rotation of the brace assemblies toward each other, and a pivot shaft extending from the outer facing portions of the diagonal brace assemblies, each tie member being pivotally carried by an associated pivot shaft.

3. A foldable cross brace assembly including a pair of crossed variable-length brace members, a pair of tie members, one on each of the opposite outer sides of said brace members and extending across the intersection thereof, conformations on said brace and tie members providing a separable pivotal connection between each of said tie members and the opposed surface of its adjacent brace member, and a pair of spacers removably secured to and extending between said tie members, said spacers being located on opposite sides of said intersection.

4. A foldable cross brace assembly including a pair of crossed variable-length brace members, a pair of tie members, one on each of the opposite outer sides of said brace members and extending across the intersection thereof, conformations on said brace and tie members providing a separable pivotal connection between each of said tie members and the opposed surface of its adjacent brace member, and a pair of spacers removably secured to and extending between said tie members, said spacers being located on opposite sides of said intersection, and additional conformations on and spaced along each of said brace members, said additional conformations being substantially identical to the first-named conformations on said brace members whereby said pivotal connection may be selectively affected with said tie members at a variety of points on said brace members.

5. A brace assembly including a pair of crossed variable-length brace members and means removably connected with said brace members to abut, pivot and couple said brace members at their crossing point, said means including a set of tie bars, each of said tie bars being separably, pivotally connected to an outer surface of one of said brace members and a pair of spacers, each of said spacers extending between and removably secured to aligned end portions of said tie bars to couple said brace members together in abutting relationship and to hold said tie bars in pivotal connection with said brace members.

6. A foldable brace assembly including a pair of crossed, variable-length brace members, each of said members including a first, hollow, elongated member having an uninterrupted inner area and a second elongated member slidable in said first member, and means removably coupling said brace members in abutted, pivotal relationship, said means including a pivot-forming conformation on the outer surface of each of said brace members, a pair of tie members, each of said tie members having a pivot-forming conformation adapted for separable pivotal mating with said brace member conformations and spacers removably secured to and extending between said tie members on opposite sides of said brace members.

7. For use in a collapsible framework structure, a pair of crossed, variable-length brace members, and means removably connected with said brace members, said means including a set of tie bars, each of said tie bars being separably, pivotally connected to an outer surface of one of said brace members, and spacer members extending between and removably secured to said tie bars to couple said brace members together in abutting relationship and to hold said tie bars in pivotal connection with said brace members.

*8. A foldable cross brace including a contiguous pair of crossed diagonal brace assemblies each including an outer tubular member and an inner member telescopically engaged therein, a pair of tie members spaced outwardly of said brace assemblies on opposite sides thereof and extending across the intersection of said assemblies, pivot means between the tie members and the outer facing portions of said tubular brace members to permit the brace assemblies to be rotated relative to each other about said pivot and whereby said inner member can slide freely past said pivot means, and a pair of spacers extending between said tie members and located on opposite sides of said pivot between said brace assemblies, said spacers being engageable with said brace assemblies to limit rotation of the brace assemblies toward each other.*

*9. A foldable cross brace including a pair of crossed diagonal brace assemblies each including an outer tubular member and an inner member telescopically engaged therein, a pair of tie members spaced outwardly of said brace assemblies on opposite sides thereof and extending across the intersection of said assemblies, pivot means between the tie members and the outer facing portions of said tubular brace members to permit the brace assemblies to be rotated relative to each other about said pivot and whereby said inner member can slide freely past said pivot means, and a pair of spacers extending between said tie members and located on opposite sides of said pivot between said brace assemblies disposed in parallel relation to one another and to said pivot, said spacers being engageable with said brace assemblies to limit rotation of the brace assemblies toward each other.*

*10. A foldable cross brace assembly including a pair of crossed variable-length brace members each including an outer tubular member and an inner member telescopically engaged therein, a pair of tie members, one on each of the opposite outer sides of said brace members and extending across the intersection thereof, pivot means between the outer surface of said tubular one of said braces and said tie members providing a pivotal connection between each of said tie members and the opposed surface of its adjacent brace member whereby said inner member can slide freely past said pivot means, and a pair of spacers secured to and extending between said tie members, said spacers being located on opposite sides of said intersection.*

11. A retractable and foldable cross brace structure comprising a pair of endwise extensible brace assemblies disposed diagonally in intermediately intersecting relation and each including endwise telescopically engaged first and second mating slide members, and floating tie plate means embracing and interconnecting oppositely outwardly facing wall portions of corresponding ones of said slide members at the region of intersection of said assemblies, said floating tie plate means including flanking mounting wall structure confronting said oppositely outwardly facing wall portions, and spacer structure offset from said region of intersection and rigidly interconnecting said mounting wall structures, said mounting wall structures including pivot means separately engaging said oppositely outwardly facing wall portions to permit the brace assemblies to be rotated relative to each other about said pivot means while allowing each of the remaining ones of said slide members to slide endwise past said pivot means.

12. A cross brace structure in accordance with claim 11 wherein said floating tie plate means constitutes an open endless framework that completely surrounds said pair of brace assemblies at said region of intersection.

13. A cross brace structure in accordance with claim 11 wherein each of said brace assemblies comprises an outer tubular slide member and an inner slide member telescopically engaged therein, said outer tubular members providing the said oppositely outwardly facing wall portions engaged by said pivot means.

14. A cross brace structure in accordance with claim 11 wherein each of the slide members that are engaged by said pivot means have corresponding means defining separate pivot positions spaced endwise therealong for selective corresponding engagement by said pivot means.

15. In a collapsible structure that includes a pair of end members and a retractable and foldable cross brace structure pivotally connected to said end members to determine the spacing of said end members, an improved cross brace structure comprising a retractable and foldable cross brace structure compising a pair of endwise extensible brace assemblies disposed diagonally in intermediately intersecting relation and each including endwise telescopically engaged first and second mating slide members that overlap endwise at the region of intersection of said assemblies when said cross brace structure is in collapsed position, and floating tie plate means embracing and interconnecting oppositely outwardly facing fall portions of corresponding ones of said slide members at said region of intersection, said floating tie plate means including flanking mounting wall structure confronting said oppositely outwardly facing wall portions, and spacer structure offset from said region of intersection and rigidly interconnecting said mounting wall structures, said mounting wall structures including pivot means separately engaging said oppositely outwardly facing wall portions to permit the brace assemblies to be rotated relative to each other about said pivot means while allowing each of the remaining ones of said slide members to slide endwise past said pivot means.

16. In a collapsible structure in accordance with claim 15 and wherein each of the slide members that are engaged by said pivot means have corresponding means defining separate pivot positions spaced endwise therealong for selective corresponding engagement by said pivot means to determine a plurality of different parallel spacing relationships of the end members.

17. In a collapsible structure in accordance with claim 15 wherein said end frames normally extend generally vertically in transversely spaced relation, and wherein the lower slide member of each brace assembly is engaged by the pivot means whereby the top of said collapsible structure collapses faster than the bottom.

References Cited

The following references, cited by the Examiner, are of record in the patented file of this patent or the original patent.

UNITED STATES PATENTS

| | | | |
|---|---|---|---|
| Re. 26,215 | 5/1967 | Usher et al. | 52—646 |
| 153,270 | 7/1874 | Newhard | 182—152 |
| 164,386 | 6/1875 | Merrick | 248—164 |
| 326,514 | 9/1885 | Moross | 287—51 |
| 2,352,090 | 6/1944 | Faller | 108—118 |
| 2,897,013 | 7/1959 | Delp | 189—15.5 |
| 3,071,204 | 1/1963 | Piltingsrud | 182—179 |
| 3,105,572 | 10/1963 | Nesslinger | 182—179 |

REINALDO P. MACHADO, *Primary Examiner.*